US011157920B2

(12) United States Patent
Bufe, III et al.

(10) Patent No.: US 11,157,920 B2
(45) Date of Patent: Oct. 26, 2021

(54) TECHNIQUES FOR INSTANCE-SPECIFIC FEATURE-BASED CROSS-DOCUMENT SENTIMENT AGGREGATION

(71) Applicant: INTERNATIONAL BUSINESS MACHINES CORPORATION, Armonk, NY (US)

(72) Inventors: John P. Bufe, III, Littleton, MA (US); Abhirut Gupta, Bangalore (IN); William G. O'Keeffe, Tewksbury, MA (US); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 14/937,551

(22) Filed: Nov. 10, 2015

(65) Prior Publication Data

US 2017/0132309 A1    May 11, 2017

(51) Int. Cl.
*G06Q 30/02* (2012.01)
*G06N 5/02* (2006.01)
*G06N 7/00* (2006.01)

(52) U.S. Cl.
CPC ......... *G06Q 30/0201* (2013.01); *G06N 5/022* (2013.01); *G06N 7/005* (2013.01)

(58) Field of Classification Search
None
See application file for complete search history.

(56) References Cited

U.S. PATENT DOCUMENTS

| 6,453,058 | B1* | 9/2002 | Murthy | G06K 9/6211 |
| | | | | 382/128 |
| 8,370,863 | B2 | 2/2013 | Grigoriev et al. | |
| 8,417,713 | B1 | 4/2013 | Blair-Goldensohn et al. | |

(Continued)

OTHER PUBLICATIONS

Mukherjee, Subhabrata & Joshi, Sachindra, "Sentiment Aggregation Using ConceptNet Ontology", International Joint Conference on Natural Language Processing, Oct. 14-18, 2013, pp. 570-578. (Year: 2013).*

(Continued)

*Primary Examiner* — Scott A. Waldron
(74) *Attorney, Agent, or Firm* — Brian F. Russell; Diana Roberts Gerhardt (57) ABSTRACT

A technique for instance-specific feature-based cross-document sentiment aggregation includes analyzing input data to determine an entity referenced in the input data. One or more salient features of the entity are identified. Multiple documents that reference the entity are located. The salient features in each of the multiple documents are identified. Respective sentiment values are assigned to each of the salient features identified in the multiple documents. Respective sub-graphs are created for each of the multiple documents. The sub-graphs specify the sentiment values assigned to each of the salient features identified in an associated one of the multiple documents. The assigned sentiment values for each of the salient features are aggregated based on the sub-graphs. Finally, output data that is associated with the input data is generated. The output data provides an indication of the aggregated sentiment value for each of the salient features.

19 Claims, 9 Drawing Sheets

(56) References Cited

U.S. PATENT DOCUMENTS

| | | | | |
|---|---|---|---|---|
| 8,589,399 B1* | 11/2013 | Lee | ................ | G06F 17/30616 |
| | | | | 707/737 |
| 8,949,211 B2 | 2/2015 | Lu et al. | | |
| 9,235,652 B1* | 1/2016 | Jeffery | ................ | G06F 16/254 |
| 2002/0143817 A1* | 10/2002 | Dutta | ................ | G09B 21/001 |
| | | | | 715/234 |
| 2004/0073548 A1* | 4/2004 | Lim | ................ | G06F 17/2755 |
| 2007/0118498 A1* | 5/2007 | Song | ................ | G06F 17/30702 |
| 2009/0106203 A1 | 4/2009 | Shi et al. | | |
| 2010/0100547 A1* | 4/2010 | Ulmer | ................ | G06F 40/169 |
| | | | | 707/739 |
| 2010/0217718 A1* | 8/2010 | Depalma | ................ | G06Q 30/018 |
| | | | | 705/317 |
| 2010/0250598 A1* | 9/2010 | Brauer | ................ | G06F 17/30622 |
| | | | | 707/780 |
| 2011/0022600 A1* | 1/2011 | Sathe | ................ | G06F 16/319 |
| | | | | 707/742 |
| 2012/0197950 A1* | 8/2012 | Dayal | ................ | G06Q 30/02 |
| | | | | 707/822 |
| 2012/0215791 A1* | 8/2012 | Malik | ................ | G06F 17/30292 |
| | | | | 707/749 |
| 2012/0254060 A1* | 10/2012 | Choudhary | ................ | G06Q 30/00 |
| | | | | 705/347 |
| 2015/0154286 A1* | 6/2015 | Lightner | ................ | G06F 19/24 |
| | | | | 707/728 |
| 2015/0178279 A1* | 6/2015 | Chen | ................ | G06F 16/9535 |
| | | | | 707/748 |
| 2015/0220539 A1* | 8/2015 | Lambert | ................ | G06F 17/30696 |
| | | | | 707/723 |
| 2016/0019659 A1* | 1/2016 | Doganata | ................ | H04L 12/185 |
| | | | | 705/319 |
| 2017/0039036 A1* | 2/2017 | Pillai | ................ | G06F 8/20 |
| 2017/0068999 A1* | 3/2017 | Parveen | ................ | G06Q 30/0282 |
| 2017/0124575 A1* | 5/2017 | Clark | ................ | G06Q 30/0201 |

OTHER PUBLICATIONS

Mukherjee, Subhabrata & Bhattacharyya, Pushpak, "Feature Specific Sentiment Analysis for Product Reviews", Lecture Notes in Computer Science, Jun. 2013, 12 pages. (Year: 2013).*

Cataldi, Mario, et al., "Good Location, Terrible Food: Detecting Feature Sentiment in User-Generated Reviews", Soc. Netw. Anal. Min., vol. 3, pp. 1149-1163. (Year: 2013).*

Lim et al.,. "A methodology for building a semantically annotated multi-faceted ontology for product family modelling." Advanced Engineering Informatics 25.2 (2011): 147-161.

Lau et al. "Automatic domain ontology extraction for context-sensitive opinion mining." ICIS 2009 Proceedings (2009): 35-53.

Cheng et al., "Fine-grained Opinion Topic and Polarity Identification." LREC. 2008.

Liu et al. "ARSA: a sentiment-aware model for predicting sales performance using blogs." Proceedings of the 30th annual international ACM SIGIR conference on Research and development in information retrieval. ACM, 2007.

Wei et al., "Sentiment learning on product reviews via sentiment ontology tree." Proceedings of the 48th Annual Meeting of the Association for Computational Linguistics. Association for Computational Linguistics, 2010.

* cited by examiner

TECHNIQUES FOR INSTANCE-SPECIFIC FEATURE-BASED CROSS-DOCUMENT SENTIMENT AGGREGATION

BACKGROUND

The present disclosure is generally directed to techniques for sentiment aggregation and, more particularly, to techniques for instance-specific feature-based cross-document sentiment aggregation.

Watson is a question answering (QA) system (i.e., a data processing system) that applies advanced natural language processing (NLP), information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

U.S. Pat. No. 7,987,088 (hereinafter "the '088 patent") discloses a method for automating the generation of an ontology from unstructured documents. The '088 patent identifies nouns as concepts in documents and an ontology is formed based on phrases surrounding the concepts. U.S. Pat. No. 7,496,593 (hereinafter "the '593 patent") discloses creating a multi-relational ontology having a predetermined structure. The '593 patent works with a base ontology that captures possible relationships between concepts and develops a knowledge network that can be used to discover relationships. U.S. Pat. No. 7,512,576 (hereinafter "the '576 patent") is directed to automatically generating an ontology by combining structured and/or semi-structured knowledge sources. According to the '576 patent, ontological relationships are inferred between extracted information by parsing a layout structure of structured and semi-structured knowledge sources in order to identify specific information. The inferred ontological relationships are then verified in relation to existing ontological sources that are available. U.S. Pat. No. 8,103,962 (hereinafter "the '962 patent") is directed to form-based ontology creation and information harvesting. According to the '962 patent, a user inputs values into a structured Web-based form. Data items, similar to the input values, are then extracted from the Web based on context and combined to create an ontology.

BRIEF SUMMARY

Disclosed are a method, a data processing system, and a computer program product (embodied in a computer-readable storage device) for instance-specific feature-based cross-document sentiment aggregation.

A technique for instance-specific feature-based cross-document sentiment aggregation includes analyzing input data to determine an entity referenced in the input data. One or more salient features of the entity are identified. Multiple documents that reference the entity are located. The salient features in each of the multiple documents are identified. Respective sentiment values are assigned to each of the salient features identified in the multiple documents. Respective sub-graphs are created for each of the multiple documents. The sub-graphs specify the sentiment values assigned to each of the salient features identified in an associated one of the multiple documents. The assigned sentiment values for each of the salient features are aggregated based on the sub-graphs. Finally, output data that is associated with the input data is generated. The output data provides an indication of the aggregated sentiment value for each of the salient features. The output data may, for example, identify one or more product features to modify to improve overall sentiment of a product and may provide an overall sentiment for the product based on the salient features.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for instance-specific feature-based cross-document sentiment aggregation.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As may be used herein, the terms 'data' and 'evidence' are interchangeable.

Conventionally, graph-based sentiment aggregation has been limited to a single document (with no cross-document aggregation) and has been based on a product domain ontology, as contrasted with an instance-specific product ontology. Sentiment analysis of documents (e.g., product review documents) has traditionally ignored a relationship between features (aspects) of a product and the product. Research has been performed on identifying product features and a polarity of the identified product features. However, conventional research has not examined the influence of product features on overall product polarity. In general, research has conventionally focused on product domain ontology to identify relationships between product features. However, relationships identified between product features have conventionally been incomplete or incorrect for many products, as relationships between product features are in constant flux and may not be readily apparent. According to an embodiment of the present disclosure, techniques are disclosed that derive an instance-specific product ontology from a product domain ontology. According to one or more aspects, the instance-specific product ontology is graphed and a relationship between product features and an influence of product feature sentiments on overall product polarity may then be determined.

According to one or more embodiments of the present disclosure, sentiments on features of a target product that are expressed in review documents may be aggregated to identify an overall polarity of the target product. According to various aspects of the present disclosure, an instance-specific product ontology for a target product is derived from a product domain ontology, salient features (e.g., determined from product documents provided by a manufacturer) of the target product are identified in product reviews, and sentiments of the salient features expressed in the product reviews are aggregated using a graph-based approach.

Figure 1:
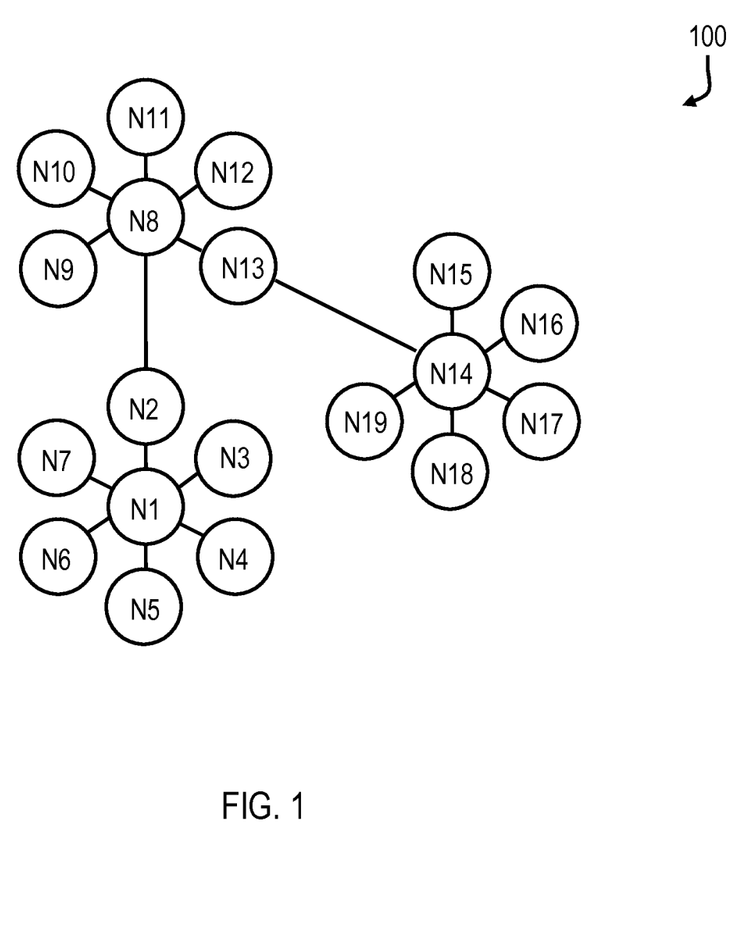
FIG. 1 is a diagram of an exemplary high performance computing (HPC) cluster that includes a number of nodes, with one or more of the nodes including multiple processors that are configured to function as a question answering (QA) system, according to various aspects of the present disclosure.

According to the present disclosure, a systematic way to derive an instance-specific product ontology is disclosed. In general, the disclosed techniques focus on determining one or more defining relationships between concepts in a data source, as contrasted with identifying all possible relationships between concepts in a data source. According to at least one embodiment of the present disclosure, a base (product domain) ontology is modified based on relationship changes or new concepts introduced from data sources (e.g., unstructured review documents and/or a manufacturer product page). According to one aspect of the present disclosure, a base ontology provides relationships between product features and unstructured data (e.g., a manufacturer product page) is accessed to provide information for modification of the base ontology Conventionally, the Watson system has explored large amounts of structured and unstructured data to find candidate answers for a question (or a problem). According to various aspects of the present disclosure, techniques for performing high performance computing (HPC), or network computing, are described herein that facilitate instance-specific feature-based cross-document sentiment aggregation. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
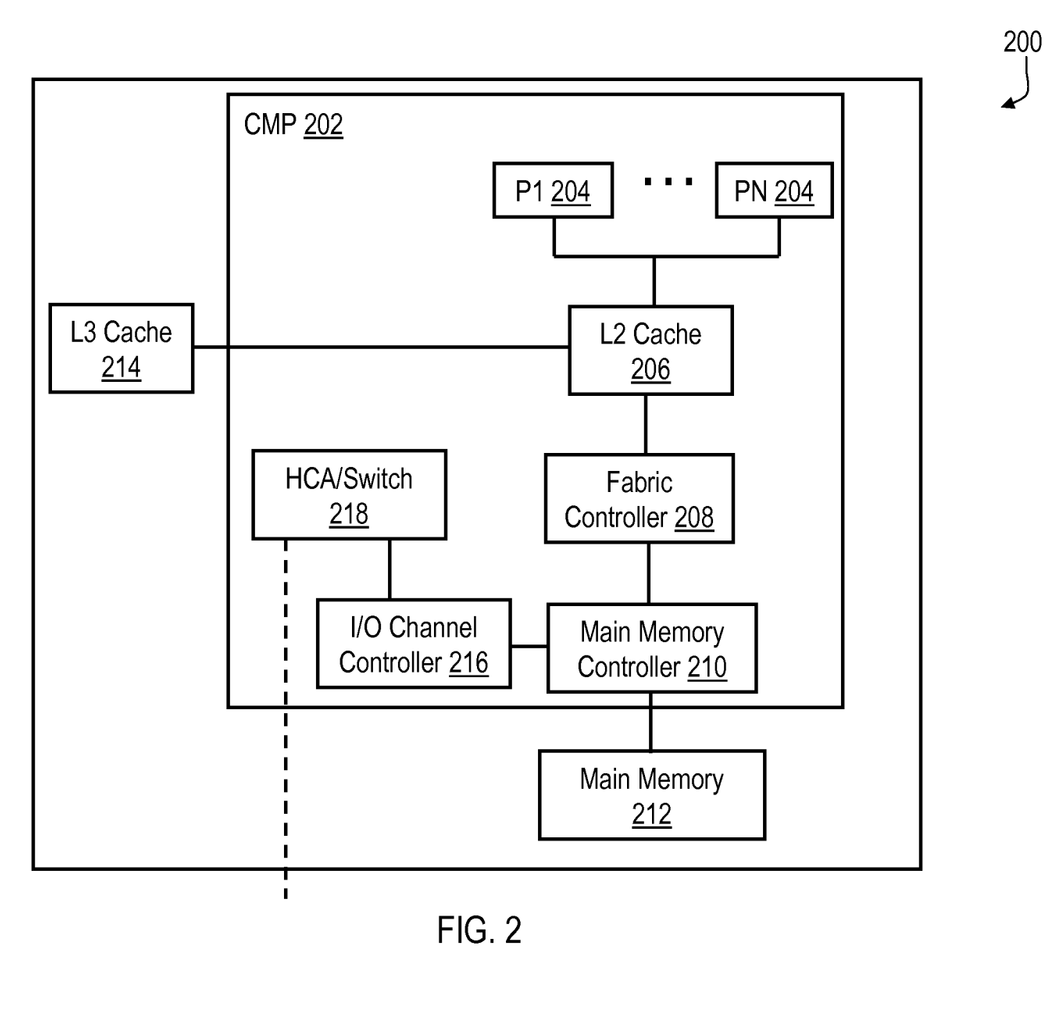
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
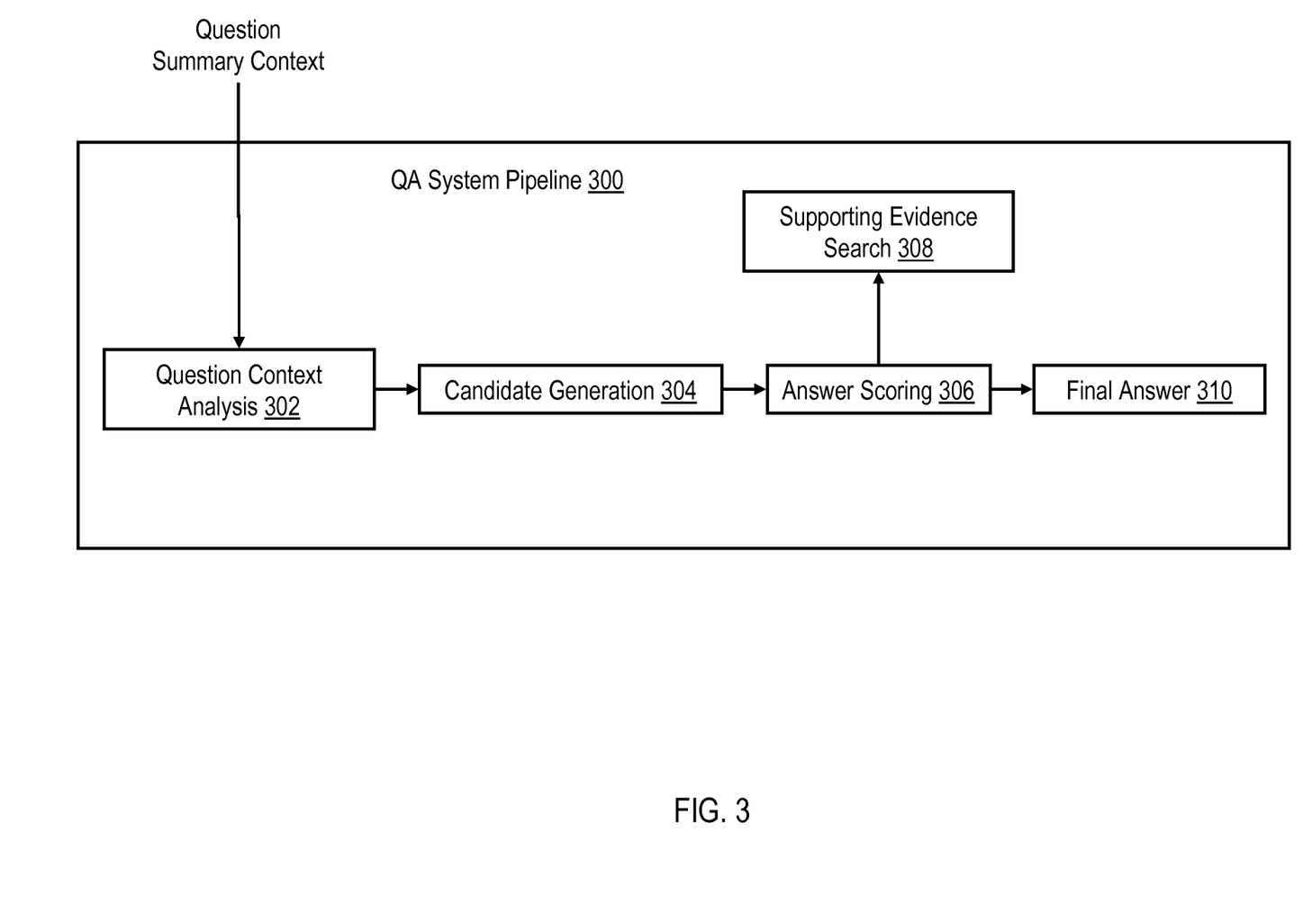
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question context analysis block 302 of QA system pipeline 300 receives question summary contexts as inputs and generates outputs representing its analysis of the contexts. A candidate answer generation block 304 of QA system pipeline 300 receives the outputs from context analysis block 302 at an input and generates candidate answers. The candidate answers are provided to an input of a candidate answer scoring block 306, which is configured to initiate a supporting evidence search (by supporting evidence search block 308) in order to score the various candidate answers. The results of the scoring are provided to a final candidate answer block 310, which is configured to provide a final candidate answer based on the scoring of the candidate answers. It should be appreciated that blocks 302-310 may be implemented in program code executing on one or more processor cores or may be directly implemented in dedicated hardware (logic).

Figure 4:
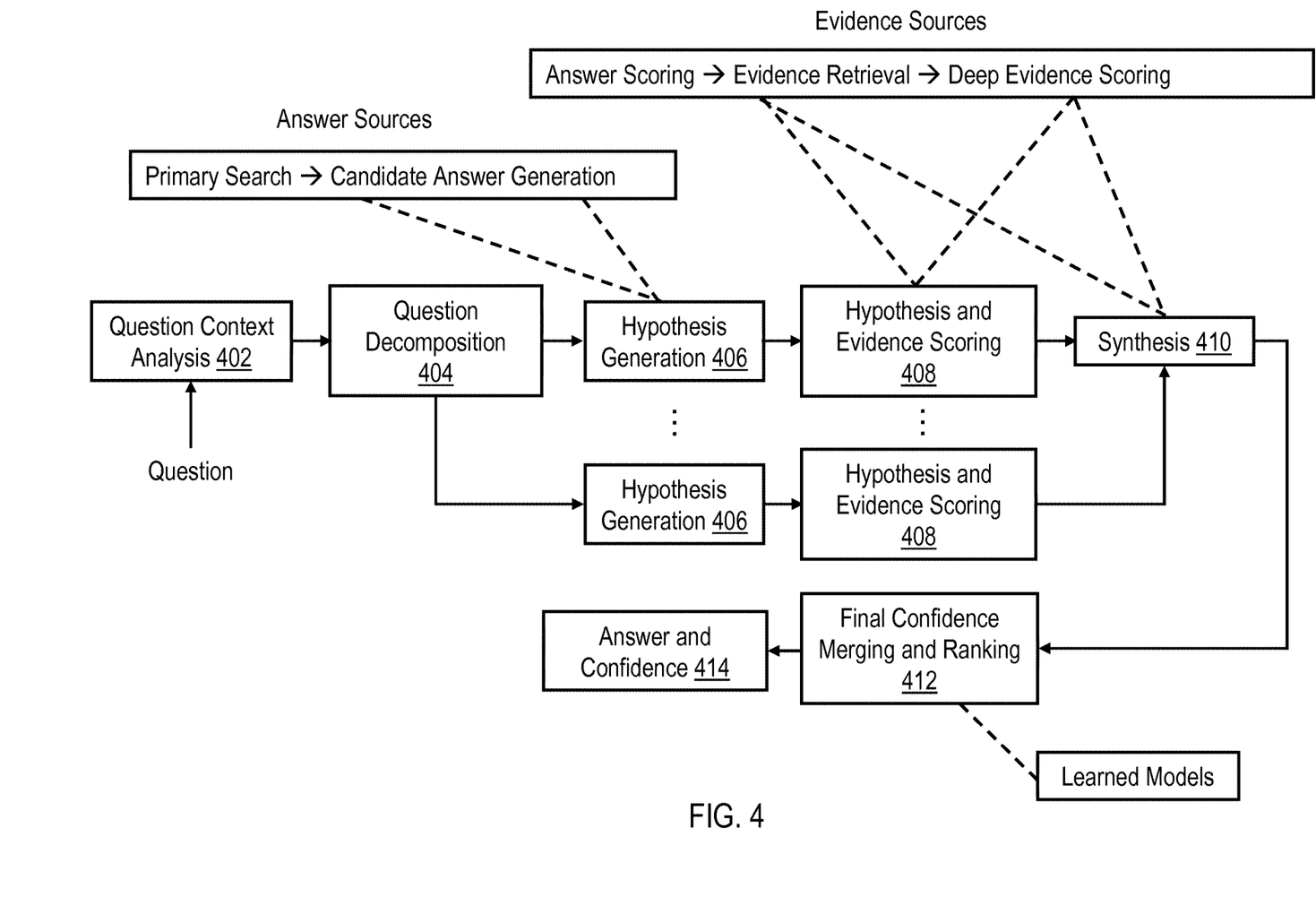
FIG. 4 depicts relevant components of the exemplary QA system pipeline of FIG. 3 in additional detail.

FIG. 4 illustrates relevant components of an exemplary QA system pipeline in additional detail. As is illustrated, question context analysis block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation for candidate answers. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system pipeline may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system pipeline may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system pipeline is further configured to score all the candidate answers using hypothesis and evidence scoring techniques (e.g., providing 'M' scores for 'M' candidate answers). In synthesis block 410 the QA system pipeline evaluates the candidate answers with the highest scores and determines which hypotheses generated the highest scores.

Following block 410, the QA system pipeline initiates final confidence merging and ranking in block 412. Finally, in block 414, the QA system pipeline provides a single answer (and may provide a confidence score) for the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system pipeline may then upload additional data required by hypotheses 'c' and 'd' into the cache and unload data used by other hypotheses from the cache. According to the present disclosure, the priority of what data is uploaded is relative to candidate answers scores (as such, hypotheses producing lower scores have less associated data in cache). When a new question is received, the above-described process is repeated. If the hypotheses 'c' and 'd' again produce best candidate answers, the QA system pipeline loads more data that is relevant to the hypotheses 'c' and 'd' into the cache and unloads other data.

If, on the other hand, hypotheses 'h' and 'g' produce the best candidate answers for the new question, the QA system pipeline loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that scoring indicates is most useful. The disclosed process may be unique to a QA system pipeline when a cache controller is coupled directly to a scoring mechanism of the QA system pipeline.

Figure 5A:
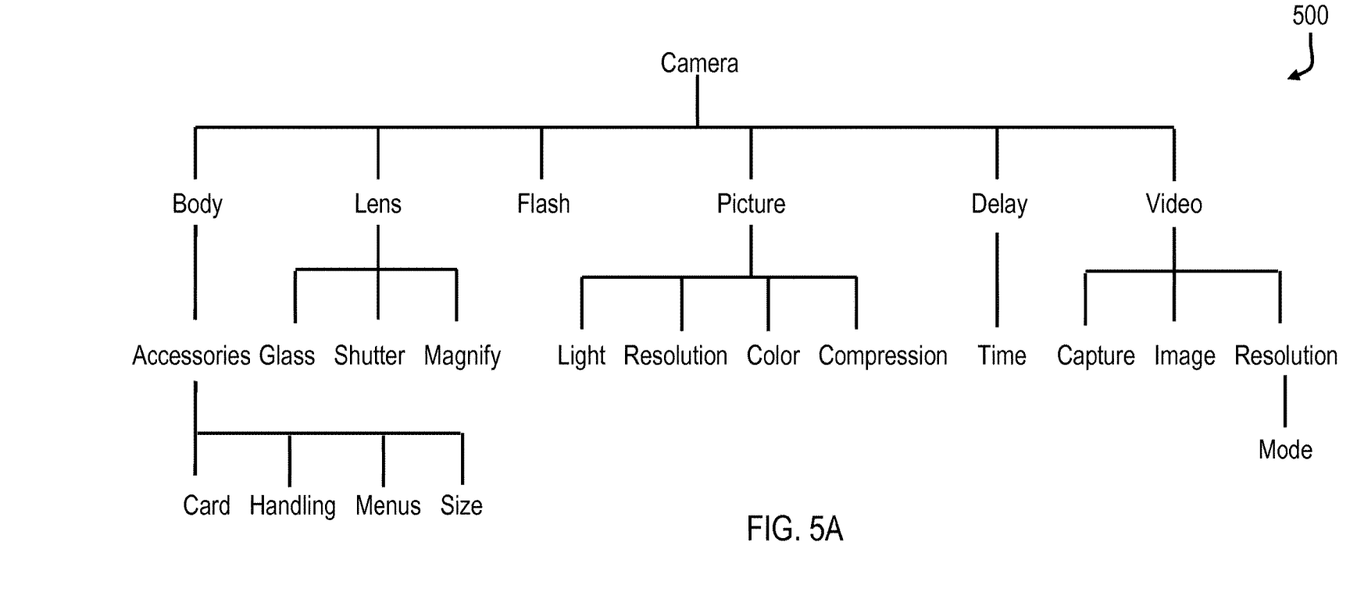
FIG. 5A is a diagram illustrating an exemplary product domain ontology for a camera in the form of a tree structure.

Conventionally, entities and relationships of the entities have been identified by merely analyzing a dataset. According to the present disclosure, a combination of a domain ontology (e.g., a product domain ontology) and a dataset (e.g., review documents and a product page) are utilized to identify entities (e.g., products), salient features (e.g., product features) and relationships between the features. With reference to FIG. 5A, a product domain ontology 500 illustrates an exemplary product domain ontology for a camera in a tree structure. For example, ontology 500 may provide a base ontology for a new version of camera X (e.g., camera X, version 7 (Camera_X_v7) that was recently released and that extends camera X, version 6 (Camera_X_v6) with improvements in picture resolution and body size.

As is illustrated, a first level of ontology 500 includes the following feature nodes: body; lens; flash; picture; delay; and video. A second level of ontology 500 includes the feature 'accessories' node dependent from the feature 'body' node. The second level of ontology 500 also includes: the feature 'glass', 'shutter', and 'magnify' nodes dependent from the feature 'lens' node; the feature 'light', 'resolution', 'color', and 'compression' node dependent from the feature 'picture' node; the feature 'time' node dependent from the feature 'delay' node; and the feature 'capture', 'image', and 'resolution' nodes dependent from the feature 'video' node. A third level of ontology 500 includes the feature 'card', 'handling', 'menus', and 'size' nodes dependent from the feature 'accessories' node. The third level of ontology 500 also includes the feature 'mode' node dependent from the feature 'resolution' node.

Given that conventional aggregation works on entity relationships, certain features that may be identified as key (salient) features in a product page may be lost due to a distance of the salient feature nodes from a product root node. According to one embodiment of the present disclosure, a product is identified (e.g., from analyzing a question input into a QA system) and a product domain ontology for the product is retrieved from a data source (e.g., DBPedia™). Salient features (e.g., features touted by product owner in an associated product page) may then be determined from analyzing an associated product page. For example, assume that 'picture resolution' and 'body size' are touted as improvements in a new camera X, version 7 according to an associated product page. As is illustrated in instance-specific product ontology 510 illustrated in FIG. 5B, a direct edge is created between a root node (e.g., camera) and non-root nodes (e.g., 'picture resolution' and 'body size') according to an embodiment of the present disclosure. A sub-graph (see, for example, FIGS. 7 and 8), e.g., a Bayesian network/model, may then be derived from ontology 510. Creating sub-graphs from am instance-specific product ontology tends to prevent sentiment of certain features from being lost due to one or more features that are between the certain features and a root node.

Figure 5B:
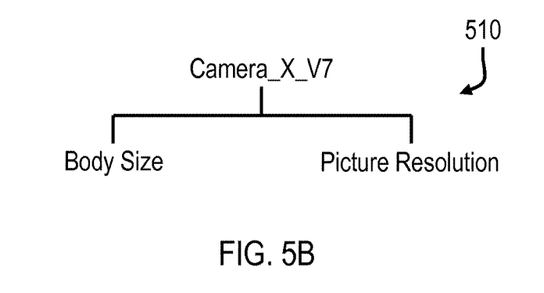
FIG. 5B is a diagram illustrating an exemplary instance-specific product ontology derived from the ontology of FIG. 5A.

As one example, assume a product review expresses: two negative sentiments about the salient features (i.e., 'picture resolution' and 'body size') of camera X, version 7; two positive sentiments about lens and video of camera X, version 7 (i.e., features that are unchanged from a previous product version, i.e., camera X, version 6); and no direct sentiment about camera X, version 7. In this case, according to the present disclosure, an overall sentiment on camera X, version 7 would be negative, rather than neutral or indeterminate, based on the product review. That is, since the negative sentiments are directed to salient features of camera X, version 7 and the positive sentiments are directed to unchanged features of camera X, version 7, the negative features generally decrease overall product sentiment more than the positive features generally increase overall product sentiment.

Figure 6A:
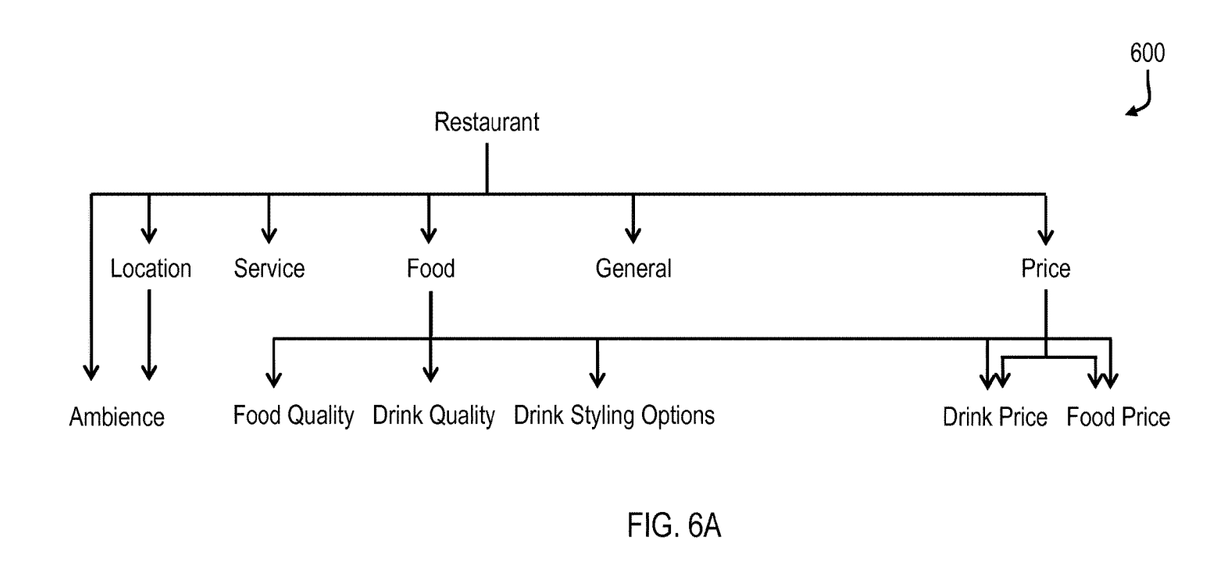
FIG. 6A is a diagram illustrating an exemplary product domain ontology for a restaurant in the form of a tree structure.

With reference to FIG. 6A, a product domain ontology 600 illustrates an exemplary product domain ontology for a restaurant in a tree structure. For example, ontology 600 may provide a base ontology for a restaurant. As is illustrated, a first level of ontology 600 includes the following feature nodes: 'ambience'; 'location'; 'service'; 'food'; 'general'; and 'price'. A second level of ontology 600 includes the feature 'ambience' node dependent from the feature 'location' node. The second level of ontology 600 also includes: the feature 'food quality', 'drink quality', 'drink styling options', 'drink price', and 'food price' nodes dependent from the feature 'food' node; the feature 'drink price' and 'food price' nodes are also dependent from the feature 'price' node.

Figure 6B:
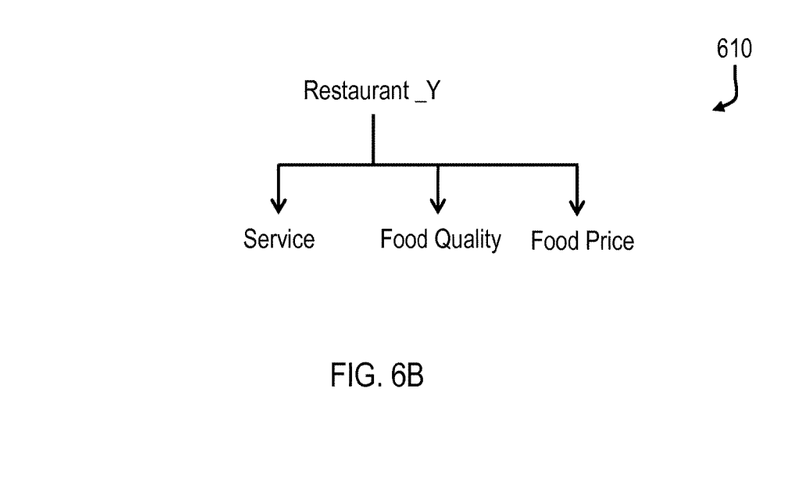
FIG. 6B is a diagram illustrating an exemplary instance-specific product ontology derived from the ontology of FIG. 6A.

As is illustrated in instance-specific product ontology 610 of FIG. 6B, a direct edge is created between a root node (e.g., restaurant) and non-root nodes (e.g., 'service', 'food quality', and 'food price') for restaurant Y (Restaurant Y), as in this example feedback from a manager of restaurant Y indicated that service, food quality, and food price were the only salient features of interest. As above, a sub-graph (see, for example, FIGS. 7 and 8), e.g., a Bayesian network/model, may then be derived from ontology 610. As noted above, creating sub-graphs from an instance-specific product ontology tends to prevent sentiment of certain features from being lost due to one or more features that are between the certain features and a root node.

According to aspects of the present disclosure, weights may be applied to salient features to weight salient features more than non-salient features, even though there may be scenarios when the non-salient features would neutralize negative reviews on salient features. According to various embodiments, relationships between non-root nodes that are not directly coupled to a root node are modified such that the non-root nodes directly influence the root node. According to various aspects, new features that are not captured in a product domain ontology can be added to an instance-specific product ontology based on concept relations inferred from a product manual, product page, product reviews, etc.

According to one or more aspects of the present disclosure, product features in product reviews are identified and aggregated using a graph-based ontology approach. Potentially relevant documents may be analyzed to identify products and features of those products. As one example, inter-document anaphora resolution may be employed to normalize and link multiple instances of specific products and features. Sentiment analysis may then be performed on the documents (specifically focusing on products and features that are objects of sentiment). A product appropriate ontology graph may then be used to create sentiment sub-graphs. Sentiment values may then be mapped onto the sentiment sub-graphs for each of the identified documents. In various embodiments, temporal and relational metrics are implemented with each sub-graph (based on characteristics of the documents) to scale the weights appropriately. For example, an exponential decay model can be used to place more emphasis on recent reviews and documents that may include more relevant and recent information. As another example, if a user has a specific interest or target in mind, a similarity metric can be generated at a document or sentence level to generate a sentiment weight. In one or more embodiments, vectors for each product and feature are then generated. For example, U.S. Pat. No. 8,457,950 discloses a method for generating vectors that may be employed to generate vectors for each product feature of interest.

Figure 7:
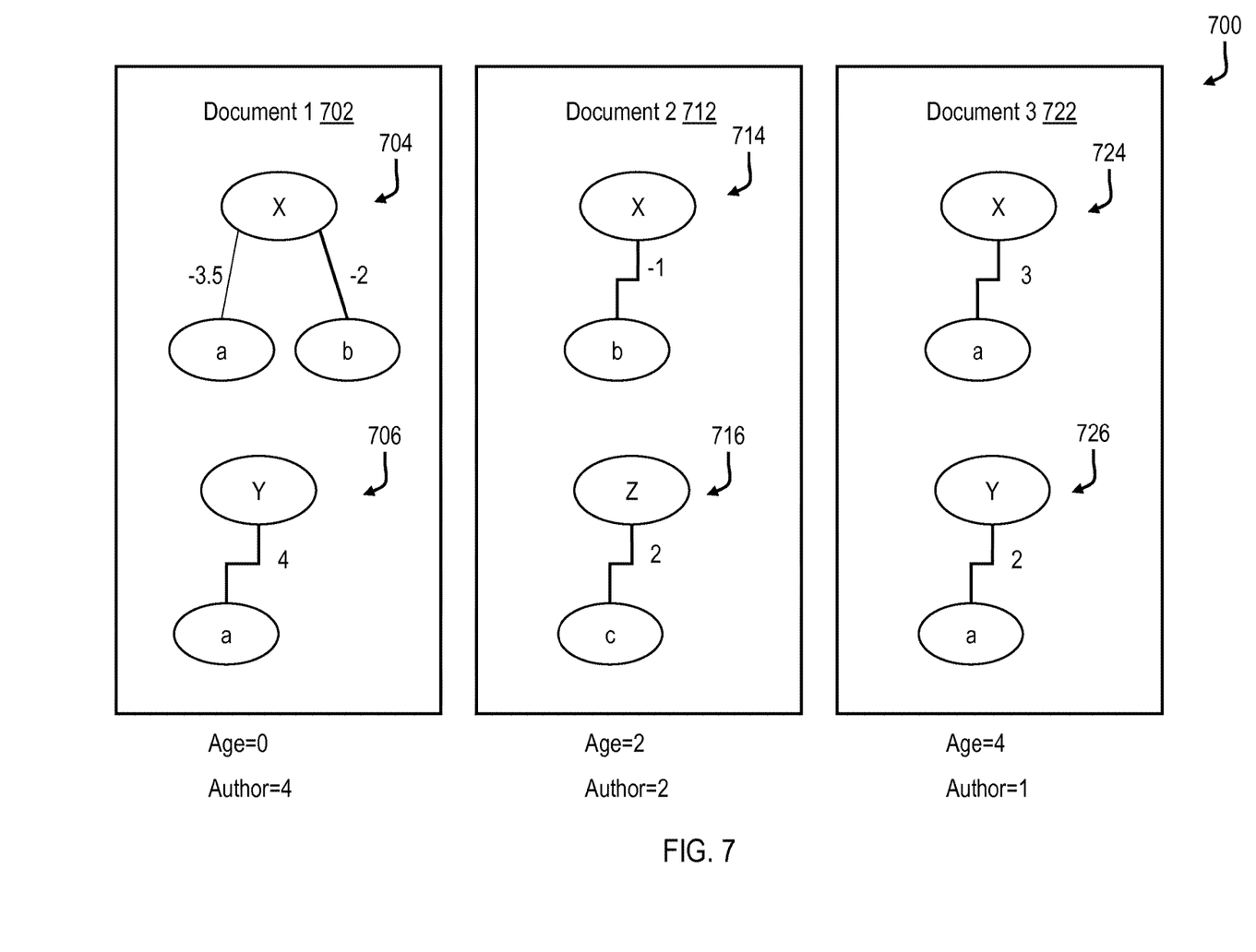
FIG. 7 is a diagram illustrating exemplary sub-graphs for three exemplary documents.

With reference to FIG. 7, three documents 702, 712, and 722 are illustrated as including salient features for entities of interest. Documents 702, 712 and 722 may be, for example, digital documents, such as web pages, digital magazines, social media pages, etc. Document 702 includes an entity 'X' and an entity 'Y' that are of interest. Document 712 includes an entity 'X' and an entity 'Z' that are of interest. Document 722 includes an entity 'X' and an entity 'Y' that are of interest. As is illustrated, with respect to document 702, a sub-graph 704 has been created for the entity 'X' with salient features 'a' and 'b' and a sub-graph 706 has been created for the entity 'Y' with salient feature 'a'. A first weight having a sentiment value of '−3.5' has been derived for the feature 'a' of the entity 'X' and a second weight having a sentiment value of '−2' has been derived for the feature 'b' of the entity 'X'. A third weight having a sentiment value of '4' has been derived for the feature 'a' of the entity 'Y'. It should be appreciated that sentiment values may be determined using various approaches discussed above.

As is illustrated, with respect to document 712, a sub-graph 714 has been created for the entity 'X' with salient feature 'b' and a sub-graph 716 has been created for the entity 'Z' with salient feature 'c'. A fourth weight having a sentiment value of '−1' has been derived for the feature 'a' of the entity 'X'. A fifth weight having a sentiment value of '2' has been derived for the feature 'c' of the entity 'Z'. As is illustrated, with respect to document 722, a sub-graph 724 has been created for the entity 'X' with salient feature 'a' and a sub-graph 726 has been created for the entity 'Y' with salient feature 'a'. A sixth weight having a sentiment value of '3' has been derived for the feature 'a' of the entity 'X'. A seventh weight having a sentiment value of '2' has been derived for the feature 'a' of the entity 'Y'. It should be noted that: document 702 has an age score of '0' and an author score of '4'; document 712 has an age score of '2' and an author score of '2'; and document 722 has an age score of '4' and an author score of '1'.

Figure 8:
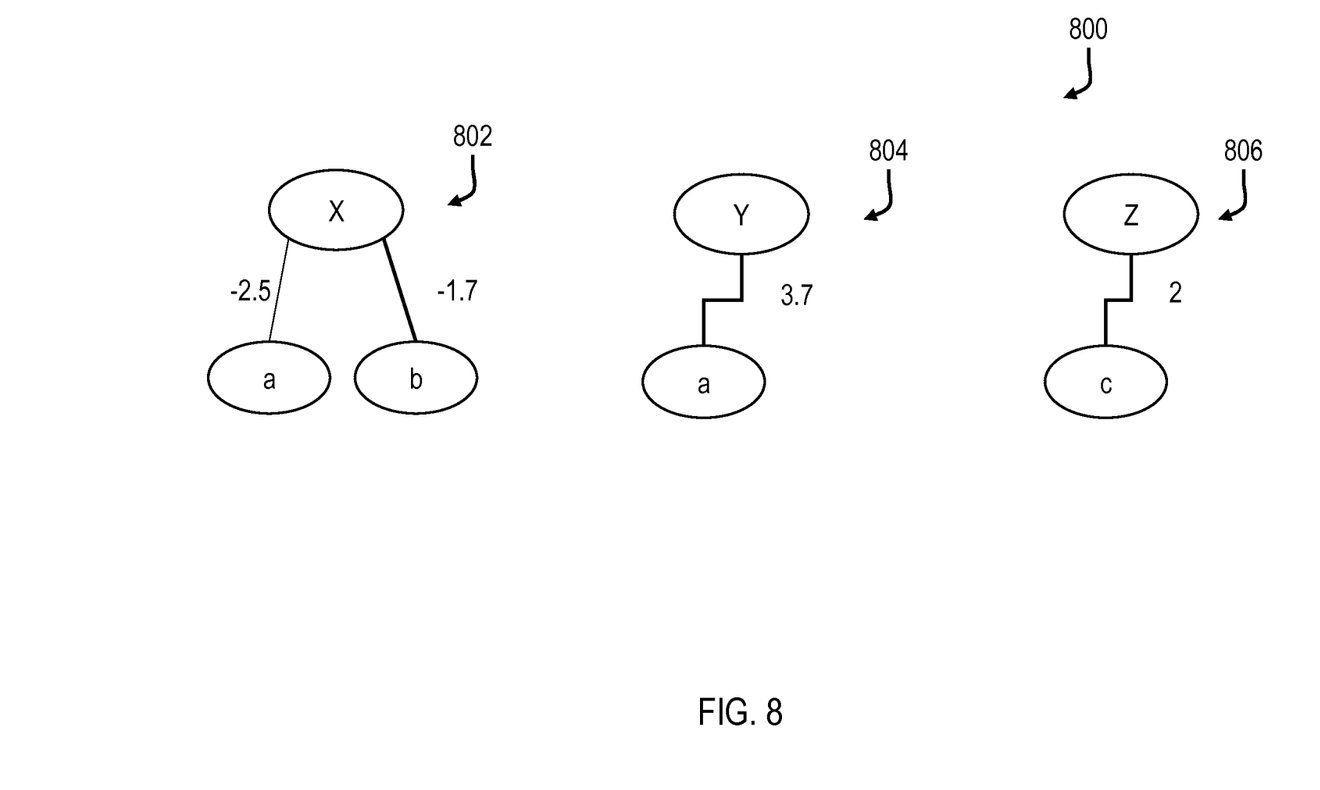
FIG. 8 is a diagram illustrating exemplary aggregated sub-graphs for the exemplary documents of FIG. 7.

With reference to FIG. 8, a diagram 800 illustrates three sub-graphs 802, 804, and 806. Sub-graphs 802 and 804 have been derived by aggregating appropriate sub-graphs in FIG. 7. More specifically, sub-graphs 704, 714, and 724 have been aggregated to create sub-graph 802 and sub-graphs 706 and 726 have been aggregated to create sub-graph 804 according to an exemplary formula (i.e., SUM (i=1 . . . n)(sentiment*0.5*(temporal score+author score))).

In the example below for document 702, an age score of '0' has a weight of '0.9' for feature 'a' of entities 'X' and 'Y' and a weight of '0.7' for feature 'b' of entity 'X'; and an author score of '4' has a weight of '0.8' for feature 'a' of entities 'X' and 'Y' and a weight of '0.6' for feature 'b' of entity 'X'. In the example below for document 712, an age score of '2' has a weight of '0.3' for feature 'b' of entity 'X'; and an author score of '2' has a weight of '0.4' for feature 'b' of entity 'X'. In the example below for document 722, an age score of '4' has a weight of '0.1' for feature 'a' of entities 'X' and 'Y'; and an author score of '1' has a weight of '0.2' for feature 'a' of entities 'X' and 'Y'. Using the values and the formula set forth above yields the following for the different feature vectors (i.e., entity/feature pairs):

$Zc=2$ $Ya=4*0.5*(0.9+0.8)+2*0.5*(0.1+0.2)=3.7$ $Xa=-3.5*0.5*(0.9+0.8)+3*0.5*(0.1+0.2)=-2.525$ $Xb=-2*0.5*(0.7+0.6)+(-1)*0.5*(0.3+0.4)=-1.65$

It should be appreciated that sub-graphs from the various identified documents are merged by identifying equivalent nodes, e.g., using the generated vectors. As one example, cosine similarity (e.g., with a threshold) may be employed to identify equivalent nodes. In one or more embodiments, when two or more sub-graphs share an edge, sentiment values are combined and weighted based on various metrics, as noted above. It should be appreciated that entity 'Z' has a positive sentiment for feature 'c', entity 'Y' has a positive sentiment for feature 'a', and entity 'X' has negative sentiments for features 'a' and 'b'. From the salient feature sentiments above, it can be inferred that both entity 'Z' and 'Y' have overall positive sentiments and that entity 'X' has an overall negative sentiment.

In general, a feature vector for each review document can be weighted based on time (i.e., how recent a review document was published), review writing quality, review author reputation, review author bias, source quality, source bias, and/or user connection/similarity to a review author. As one example, an exponential decay function may be implemented to prefer more recent documents since things may change over time and more recent documents may generally be preferred. Various sub-features (such as spelling, grammar, length, vocabulary, cohesiveness, etc.) may be used to determine writing quality. Many sites track user comments and a helpfulness of the user comments. As one example, a number of comments and average helpfulness can be combined to determine a score for a review author reputation. An average rating/sentiment of a user on items the user comments about can contribute to a review author bias score that may be used to normalize or moderate views of a review author. Information that certain sites or content sources include more accurate sources of information (e.g., in general or regarding specific products/features) and may be used to develop a source quality score. For example, an information source may be known to be particularly harsh or lenient (in general or regarding specific products/features) and, as such, a source bias may be adjusted. A review author profile and history may be compared to a user profile and history to look for similar products that have been looked at, reviewed, and purchased or similar interests mentioned in the profile may be used to develop weights. An experience level of a review author or familiarity of a review author with similar subjects may be considered when adjusting a weight.

As mentioned above, when merging a product-feature link across multiple documents with varying sentiment values, document features can be used to appropriately weight and scale various values. As another example a weighting approach may be implemented as follows: let '$SX_{ai}$' be a sentiment score for product 'X' and feature 'a' in document 'I'; let '$Gi$' be a normalization function for the 'ith' feature; let '$fi$' be a normalized 'ith' feature; let '$Fi=\{S*i, f1, f2, f3, \ldots, fn\}$' be a feature vector prepended by the sentiment scores for document 'I' and '$Fij$' be the 'jth' feature score in the 'ith' document; let '$Xa=\{F1, F2, F3, \ldots, Fm\}$' be the set of feature vectors corresponding to the link between product 'X' and feature 'a'. A standard machine learning model can be generated to determine the appropriate weights for each of the features such that SUM $(i=1 \ldots n)\{Wi\}=1$ and $S*SUM(i=1 \ldots n)\{fi*Wi\}$ is optimized using supervised training data. Each function '$Gi$' may take an array of values (in this case, 'm') and scale them appropriately such that $SUM(i=1 \ldots m)\{fi\}=1$. In this case, the final sentiment value for 'Xa' is then SUM(i=1 . . . m) $\{SX_{ai}*SUM(j=1 \ldots n) \{Fij*Wj\} \}/m$.

Figure 9:
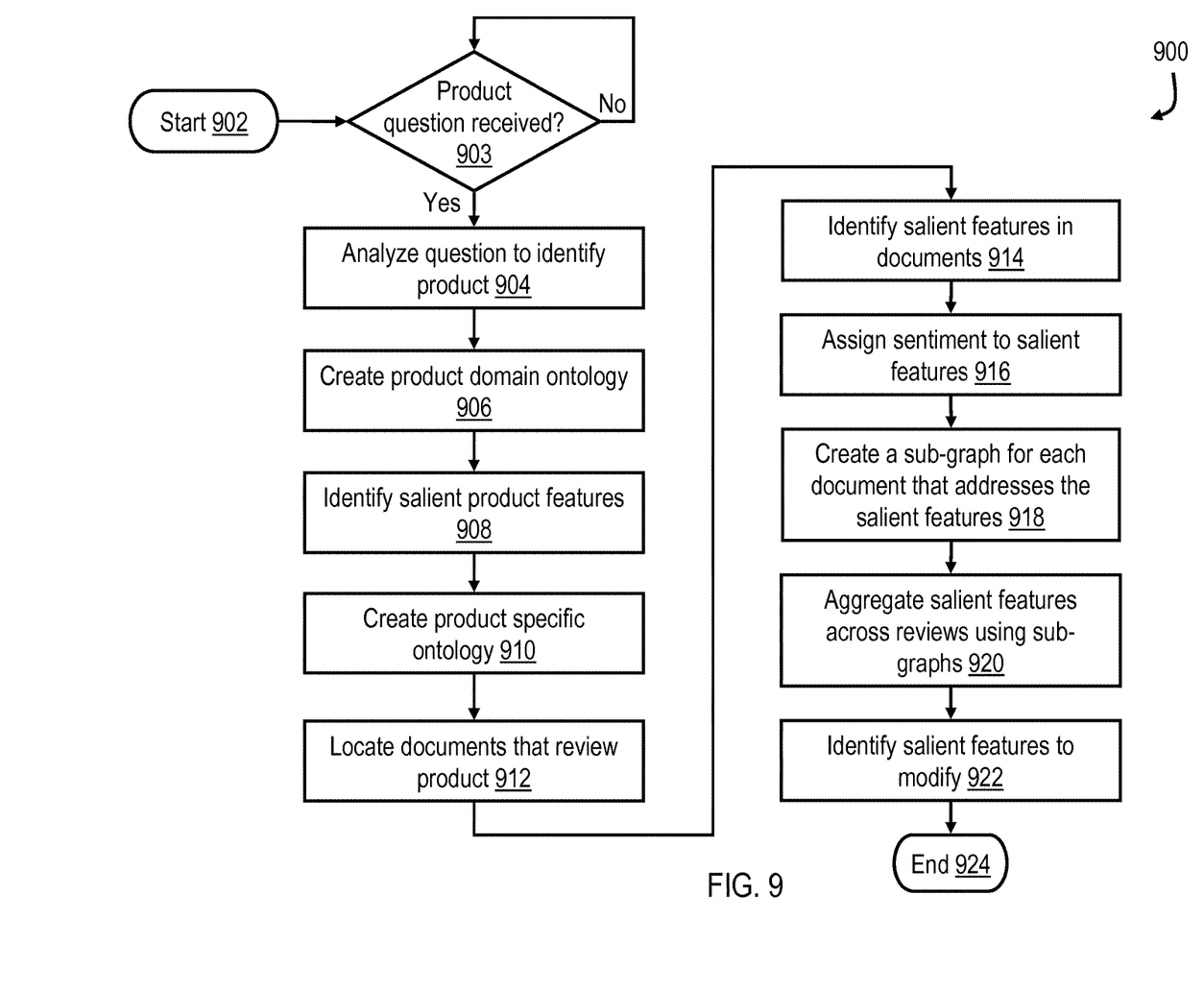
FIG. 9 is a flowchart of an exemplary process for instance-specific feature-based cross-document sentiment aggregation, according to an embodiment of the present disclosure.

With reference to FIG. 9, an exemplary process 900 for instance-specific feature-based cross-document sentiment aggregation, according to an embodiment of the present disclosure, is illustrated. Process 900 may be, for example, executed by one or more data processing systems 200 that implement a QA system, as discussed above. In block 902 process 900 is initiated, e.g., in response to data processing system 200 receiving input data from a user. Next, in decision block 903 data processing system 200 determines whether the input is a question about a product. For example, a user may input a question asking what features of a specific product require improvement (e.g., "How can Camera_X_V7 be improved to increase the sentiment of the camera?"). In response to the input not corresponding to a product question control loops on block 903. In response to the input corresponding to a product question control transfers from block 903 to block 904.

In block 904, data processing system 200 analyzes the input data to determine an entity (e.g., product or service) referenced in the input data. Next, in block 906, data processing system 200 creates a product domain ontology for the product (e.g., by accessing DBpedia). Then, in block 908, data processing system 200, identifies one or more salient features of the product (e.g., by referencing a product page to determine what features are touted). Next, in block 910, data processing system 200 creates an instance-specific product ontology for the product based on the identified salient features. Then, in block 912, data processing system 200 locates multiple documents (e.g., product review documents) that reference the product, for example, by automatically performing one or more Internet searches for the entity referenced in the input data. Next, in block 914, data processing system 200 identifies which salient features are referenced in each of the multiple documents. Then, in block 916, data processing system 200 assigns respective sentiment values to each of the salient features identified in the multiple documents.

Next, in block 918, data processing system 200 creates respective sub-graphs for each of the multiple documents. The sub-graphs specify the sentiment values assigned to each of the salient features identified in an associated one of the multiple documents. Then, in block 920, data processing system 200 aggregates the assigned sentiment values for each of the salient features based on the sub-graphs. Next, in block 922, data processing system 200 generates output data that is associated with the input data. The output data provides an indication of the aggregated sentiment value for each of the salient features. For example, the output data may identify one or more of the product features to modify to improve overall sentiment of the product and may provide an overall sentiment for the product based on the salient features. From block 922 control transfers to block 924, where process 900 terminates.

Accordingly, techniques have been disclosed herein that advantageously implement instance-specific feature-based cross-document sentiment aggregation to identify product features to modify to improve overall sentiment of an associated product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of instance-specific feature-based cross-document sentiment aggregation, the method comprising:
   analyzing, by a data processing system, input data to identify an entity referenced in the input data;
   identifying, by the data processing system, one or more salient features of the entity based on a document associated with the entity;
   locating, by the data processing system, multiple documents that reference the entity;
   identifying, by the data processing system, the salient features in each of the multiple documents;
   assigning, by the data processing system, respective sentiment values to each of the salient features identified in the multiple documents;
   creating, by the data processing system, respective sub-graphs for each of the multiple documents from a graph, wherein the sub-graphs specify the sentiment values assigned to each of the salient features identified in an associated one of the multiple documents;
   aggregating, by the data processing system, the assigned sentiment values for each of the salient features based on the sub-graphs, wherein the aggregating includes combining sentiment values from two or more of the multiple documents to determine a respective single aggregated sentiment value for each of the salient features, and wherein combining sentiment values includes scaling a sentiment value of a salient feature provided by a first document among the multiple documents based on a temporal score of the first document; and
   generating, by the data processing system, output data that is associated with the input data, wherein the output data provides an indication of the respective single aggregated sentiment value for each of the salient features, and wherein creating the sub-graphs prevents the sentiment values for each of the salient features from being lost due to one or more other features being between the salient features and a root node of the graph, where the entity is a product, the salient features are product features of the product, the documents include reviews of the product, the cross-document sentiment aggregation identifies overall sentiment of the product across multiple product reviews, and the document associated with the entity is a manufacturer-provided product document.

2. The method of claim 1, wherein the creating includes creating the sub-graphs based on a probabilistic model/network.

3. The method of claim 2, wherein the probabilistic model/network is a Bayesian model/network.

4. The method of claim 1, further comprising:
identifying one or more of the product features to modify to improve overall sentiment of the product.

5. The method of claim 1, wherein the output data identifies one or more product features to modify to improve overall sentiment of the product.

6. The method of claim 1, wherein the input data is a question and the output data is a response to the question that identifies one or more product features to modify to improve overall sentiment of the product.

7. The method of claim 1, wherein combining sentiment values includes scaling a sentiment value of a salient feature provided by a first document among the multiple documents based on the temporal score of the first document and at least one of the following: an author score of an author of the first document and a document quality score of the first document.

8. A computer program product configured for instance-specific feature-based cross-document sentiment aggregation, the computer program product comprising:
a computer-readable storage device; and
computer-readable program code embodied on the computer-readable storage device, wherein the computer-readable program code, when executed by a data processing system, causes the data processing system to:
analyze input data to identify an entity referenced in the input data;
identify one or more salient features of the entity based on a document associated with the entity;
locate multiple documents that reference the entity;
identify the salient features in each of the multiple documents;
assign respective sentiment values to each of the salient features identified in the multiple documents;
create respective sub-graphs for each of the multiple documents from a graph, wherein the sub-graphs specify the sentiment values assigned to each of the salient features identified in an associated one of the multiple documents;
aggregate the assigned sentiment values for each of the salient features based on the sub-graphs, wherein the data processing system aggregates the assigned sentiment values by combining sentiment values from two or more of the multiple documents to determine a respective single aggregated sentiment value for each of the salient features, and wherein combining sentiment values includes scaling a sentiment value of a salient feature provided by a first document among the multiple documents based on a temporal score of the first document; and
generate output data that is associated with the input data, wherein the output data provides an indication of the respective single aggregated sentiment value for each of the salient features, and wherein creating the sub-graphs prevents the sentiment values for each of the salient features from being lost due to one or more other features being between the salient features and a root node of the graph, where the entity is a product, the salient features are product features of the product, the documents include reviews of the product, the cross-document sentiment aggregation identifies overall sentiment of the product across multiple product reviews, and the document associated with the entity is a manufacturer-provided product document.

9. The computer program product of claim 8, wherein the sub-graphs are created based on a probabilistic model/network.

10. The computer program product of claim 9, wherein the probabilistic model/network is a Bayesian model/network.

11. The computer program product of claim 8, wherein the computer-readable program code, when executed by the data processing system, further configures the data processing system to:
identify one or more of the product features to modify to improve overall sentiment of the product.

12. The computer program product of claim 8, wherein the output data identifies one or more product features to modify to improve overall sentiment of the product.

13. The computer program product of claim 8, wherein the input data is a question and the output data is a response to the question that identifies one or more product features to modify to improve overall sentiment of the product.

14. A data processing system, comprising:
a cache memory; and
a processor coupled to the cache memory, wherein the processor is configured to:
analyze input data to identify an entity referenced in the input data;
identify one or more salient features of the entity based on a document associated with the entity;
locate multiple documents that reference the entity;
identify the salient features in each of the multiple documents;
assign respective sentiment values to each of the salient features identified in the multiple documents;
create respective sub-graphs for each of the multiple documents from a graph, wherein the sub-graphs specify the sentiment values assigned to each of the salient features identified in an associated one of the multiple documents;
aggregate the assigned sentiment values for each of the salient features based on the sub-graphs, wherein the processor aggregates the assigned sentiment values by combining sentiment values from two or more of the multiple documents to determine a respective single aggregated sentiment value for each of the salient features, and wherein combining sentiment values includes scaling a sentiment value of a salient feature provided by a first document among the multiple documents based on a temporal score of the first document; and
generate output data that is associated with the input data, wherein the output data provides an indication of the respective single aggregated sentiment value for each of the salient features, and wherein creating the sub-graphs prevents the sentiment values for each of the salient features from being lost due to one or more other features being between the salient features and a root node of the graph, where the entity is a product, the salient features are product features of the product, the documents include reviews of the product, the cross-document sentiment aggregation identifies overall sentiment of the product across multiple product reviews, and the document associated with the entity is a manufacturer-provided product document.

15. The data processing system of claim 14, wherein the processor is further configured to:
    identify one or more of the product features to modify to improve overall sentiment of the product.

16. The data processing system of claim 14, wherein the output data identifies one or more product features to modify to improve overall sentiment of the product.

17. The data processing system of claim 14, wherein the input data is a question and the output data is a response to the question that identifies one or more product features to modify to improve overall sentiment of the product.

18. The data processing system of claim 14, wherein the sub-graphs are created based on a probabilistic model/network.

19. A method of instance-specific feature-based cross-document sentiment aggregation, comprising:
    analyzing, by a data processing system, input data to identify an entity referenced in the input data;
    identifying, by the data processing system, one or more salient features of the entity based on a document associated with the entity;
    locating, by the data processing system, multiple documents that reference the entity;
    identifying, by the data processing system, the salient features in each of the multiple documents;
    assigning, by the data processing system, respective sentiment values to each of the salient features identified in the multiple documents;
    creating, by the data processing system, respective sub-graphs for each of the multiple documents from a graph, wherein the sub-graphs specify the sentiment values assigned to each of the salient features identified in an associated one of the multiple documents;
    aggregating, by the data processing system, the assigned sentiment values for each of the salient features based on the sub-graphs, wherein the aggregating includes combining sentiment values from two or more of the multiple documents to determine a respective single aggregated sentiment value for each of the salient features, and wherein combining sentiment values includes scaling a sentiment value of a salient feature provided by a first document among the multiple documents based on an author score of the author of the first document; and
    generating, by the data processing system, output data that is associated with the input data, wherein the output data provides an indication of the respective single aggregated sentiment value for each of the salient features, and wherein creating the sub-graphs prevents the sentiment values for each of the salient features from being lost due to one or more other features being between the salient features and a root node of the graph and thereby improves functioning of the data processing system in performing the sentiment aggregation for each of the salient features, where the entity is a product, the salient features are product features of the product, the documents include reviews of the product, the cross-document sentiment aggregation identifies overall sentiment of the product across multiple product reviews, and the document associated with the entity is a manufacturer-provided product document.

* * * * *